United States Patent [19]
Gertz

[11] Patent Number: 5,422,631
[45] Date of Patent: Jun. 6, 1995

[54] APPARATUS AND METHOD FOR INTERCONNECTING ELECTRONIC PRODUCTS

[75] Inventor: Jonathan Gertz, Lexington, Ky.

[73] Assignee: Audio Authority Corporation, Lexington, Ky.

[21] Appl. No.: 228,941

[22] Filed: Apr. 18, 1994

Related U.S. Application Data

[63] Continuation of Ser. No. 783,849, Oct. 29, 1991, abandoned.

[51] Int. Cl.$^6$ .............................................. H04Q 1/00
[52] U.S. Cl. ......................... 340/825.25; 340/825.22; 455/6.3; 370/112
[58] Field of Search ...................... 340/825.08, 825.22, 340/825.25; 381/81, 123; 455/5.1, 6.3; 370/112

[56] References Cited

U.S. PATENT DOCUMENTS

| | | | |
|---|---|---|---|
| 4,100,533 | 7/1978 | Napolitano | 340/825.22 |
| 4,142,216 | 2/1979 | Goss . | |
| 4,156,866 | 5/1979 | Miller . | |
| 4,176,251 | 11/1979 | Odlen et al. . | |
| 4,232,231 | 11/1980 | Reed . | |
| 4,281,314 | 7/1981 | Hunt . | |
| 4,691,361 | 9/1987 | Yoshino | 381/81 |
| 4,845,756 | 7/1989 | Seen | 381/81 |
| 4,879,751 | 11/1989 | Franks | 381/123 |

FOREIGN PATENT DOCUMENTS

| | | |
|---|---|---|
| 0380188 | 1/1990 | European Pat. Off. . |
| 0361585 | 4/1990 | European Pat. Off. . |
| 0398550 | 11/1990 | European Pat. Off. ....... 340/825.25 |

OTHER PUBLICATIONS

The OnSite System 4000 Generation, product brochure, date of publication unknown.

Matrix Systems, product brochure, date of publication unknown.
The OnSite System, A Handbook for Installlation, Operation and Service, date of publication, Oct. 1991.
Matrix Systems, A Handbook for Installation, Operation and Service, second printing Oct. 1991.

*Primary Examiner*—Donald J. Yusko
*Assistant Examiner*—Brian Zimmerman
*Attorney, Agent, or Firm*—King & Schickli

[57] ABSTRACT

A switching network including a plurality of nodes, one node connected to a product of different electronic product groups on display. Each node includes a satellite node microprocessor and a cooperating product selector switch for selectively actuating said cooperating connected electronic product. An indicator lamp is also provided at each node. Illumination of the lamp indicates an operating condition of the electronic product connected to the node. Further, each node includes an address memory to identify the node and the connected electronic product. The satellite node microprocessors of each node are operatively connected by a bus to a central control unit. The central control unit includes a host microprocessor for supervising all network functions and product selectors for actuating selected electronic products connected to the nodes. In accordance with the present method of interconnecting selected electronic products to establish a product system, is the assigning of an unique address number to each node and, hence, each connected electronic product. The method also includes the polling of the nodes to solicit service request messages from the nodes and the sending of product control commands to the nodes from the central control unit. Then comes the step of interconnecting those electronic products selected by service request messages and product control commands.

22 Claims, 8 Drawing Sheets

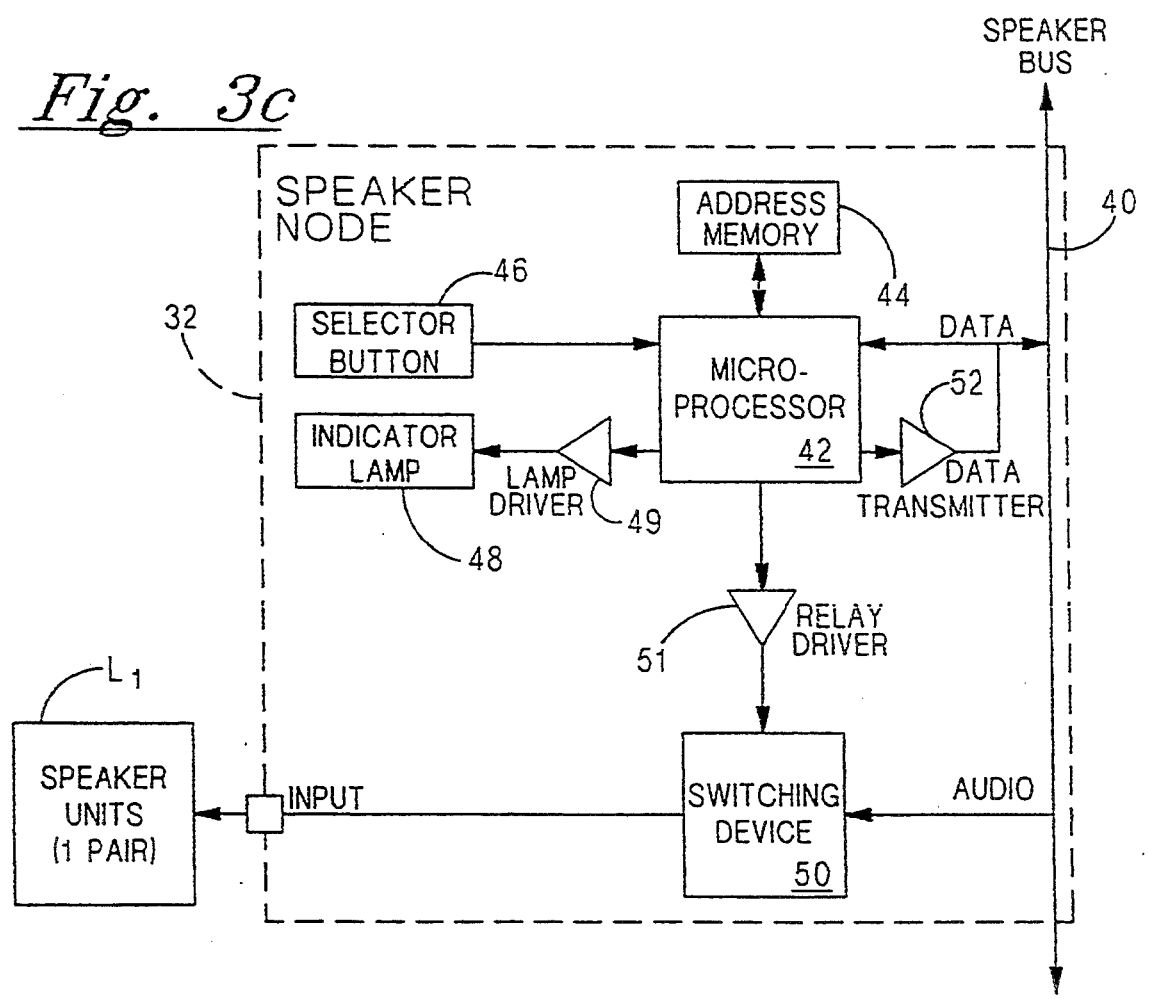

APPARATUS AND METHOD FOR INTERCONNECTING ELECTRONIC PRODUCTS

This is a continuation of U.S. patent application Ser. No. 07/783,849, filed Oct. 29, 1991, entitled "Apparatus and Method for Interconnecting Electronic Products" now abandoned.

TECHNICAL FIELD

The present invention relates generally to retail selling of consumer electronics and, more particularly, to an advanced switching network for interconnecting selected products of different electronic product groups on display to allow active demonstration.

BACKGROUND OF THE INVENTION

Retailers largely rely upon active demonstrations to present electronic consumer products and, particularly, audio and video entertainment products to customers. Such active demonstrations allow the customers to explore product features, directly compare products and match customer needs and desires with the available products. Accordingly, active demonstrations are very effective in facilitating sales of consumer electronic products.

Presently, there are two standard types of product demonstration switchers. The first is the master control panel type. This type of switcher has displays and controls on a single, localized panel and is best suited for demonstration by a sales person. The displays on this type of product demonstration switcher typically include the current product selections and the system configuration, that is, how current selections are interconnected. The displays may also include prices and product installation information.

The controls of the master control panel type of product demonstration switcher allow one to select particular products for demonstration. Additionally, the controls typically allow individual product comparisons as well as system or group product comparisons. An input means is often provided for entering product brands, model numbers, prices, installation information, etc. into the system. In advanced systems, provision may also be made for the transfer of information to the store point-of-sale system or electronic cash register for use in transacting any sale. The major drawback to this type of demonstration switcher is that it is not amenable to direct operation by customers without supervision from sales personnel. Many customers find this limitation inconvenient and annoying. Some may even choose to do their shopping at competing retailers that have a demonstration switcher more adapted to their direct control (e.g. a button-per-product type demonstration switcher; see below).

The second type of demonstration switcher may be called the "button-per-product" type. Demonstration switchers of this type are better understood and adapted for self-service by customers. A typical system includes a pushbutton selector and an indicator light next to each product. Illumination of the light indicates that that particular product is presently selected and being demonstrated.

Conventional button-per-product type switchers have certain advantages to the retailer over the master control panel type switchers. More particularly, the capacity of button-per-product type switchers may be exactly tailored to the size of the display and the type of merchandise being sold. The system may be expanded at will in small increments so as to minimize capital investment, yet allow the necessary flexibility for the retailer to increase its product lines. Further, customers are encouraged to help themselves, thereby placing less burden upon the sales staff. Additionally, since there is no central control panel, little dedicated space is required and, accordingly, more product display space is available.

Conventional button-per-product type switchers do, however, suffer some disadvantages. They are not as powerful as master control panel type switchers. This leads to significant shortcomings in this type of switcher system. More particularly, conventional button-per-product type switchers cannot preselect systems or products. They also cannot preselect two products to allow instantaneous or A/B comparison. This can be particularly frustrating for a consumer ready to make a significant investment in electronic products but having difficulty choosing between the products.

Further disadvantages of conventional button-per-product type switchers include an inability to communicate with external databases or displays. Further, in large displays, there is no convenient access to distant products. Often the customer wishes to compare products that are out of reach and may, in fact, be across a listening room. Button-per-product type switchers also do not allow wireless remote control.

From a review of the above, it should be appreciated that neither conventional master control panel type switchers nor conventional button-per-product type switchers provide all the answers to the various needs of the retailer selling electronic products. The master control panel type switcher has certain advantages not characteristic of button-per-product switchers and vice versa. A need is therefore identified for a switching network marrying the desirable and essential characteristics of master control panel and button-per-product type switchers so as to better meet the needs of the retailers.

SUMMARY OF THE INVENTION

Accordingly, a primary object of the present invention is to provide a switching system or network for the interconnection and active demonstration of consumer electronic products overcoming the above-described limitations and disadvantages of the prior art.

Another object of the present invention is to provide a switching network that is particularly easy to install and also incorporates an internal diagnostic system that readily identifies system faults and product connection errors.

Yet another object of the present invention is to provide a switching network that is more powerful and incorporates more flexible architecture to allow a greater choice of product demonstration nodes and operational features and thereby enhance the ability to sell retail electronic products.

Still another object of the invention is to provide a switching network marrying the best characteristics of conventional master control panel and button-per-product type demonstration switchers and to thereby enhance overall consumer appeal and satisfaction. Additionally, the network also allows instantaneous comparison of electronic products to aid a customer in making a selection and, thereby, aid the retailer in making a sale.

Additional objects, advantages and other novel features of the invention will be set forth in part in the description that follows and in part will become apparent to those skilled in the art upon examination of the following or may be learned through the practice of the invention. The objects and advantages of the invention may be realized and obtained by means of the instrumentalities and combinations particularly pointed out in the claims.

To achieve the foregoing and other objects and in accordance with the purposes of the present invention as described herein, a new, improved switching network is provided for interconnecting selected products of different electronic product groups on display. Advantageously, the switching network allows a multi-product system to be established for active demonstration of the selected electronic products with a flexibility of operation heretofore unavailable to retailers of those products.

The switching network includes a plurality of nodes. Each product on display is operatively connected to one node. Each node also includes a cooperating product selector button and relay for selectively activating the connected electronic product.

The switching network also includes a central control unit including a control means in the form of a host microprocessor for supervising all network functions. A bus system is provided for operatively connecting the central control unit with the plurality of nodes. Through this bus system the central control unit controls communications with all the nodes and signal routing on the busses, monitors the electronic products and also performs audio diagnostic functions to confirm proper system operation.

Preferably, the central control unit is also connected to a control terminal including product selectors for activating selected products connected to the nodes. Through the product selector buttons at the nodes and the product selectors at the control terminal, the electronic products may be selected, respectively, from a position adjacent each product on display or from a central location. Hence, the switching network is adapted for both self-demonstration by customers (selecting products through the product selector switches adjacent the products) or demonstration by a sales person (from the control terminal). This significantly increases the flexibility of the system to aid the retailer in completing the sales transaction. More particularly, the flexibility of the present switching network allows the customer to explore the features and performance of various electronic products on his own if desired or when sales personnel are busy helping other customers. Additionally, the switching network allows sales personnel to advantageously control demonstrations when working with a customer one-on-one to make direct product comparisons.

In accordance with an important aspect of the present invention, each node includes a node microprocessor. The node microprocessor is in two-way communication with the host microprocessor of the central control unit through an interconnecting bus. Each node also includes an address memory that is provided with a unique address that identifies the node and, correspondingly, the connected electronic product. No two addresses within any product group are identical. Each node also includes an indicator lamp. Illumination of this lamp indicates that the product on display adjacent the node is currently selected for operation.

The host microprocessor of the central control unit includes a node communications multiplexer for directing communications from the host microprocessor along the various busses to the plurality of nodes. Preferably, this communication is expressed in serial binary form. Serial binary data transfer simplifies overall bus system requirements. More particularly, a single signal line carries data bidirectionally between the host microprocessor and the node microprocessors of the nodes.

In order to achieve this end, a master-slave communications strategy is utilized. All communications are managed by the (master) host microprocessor of the central control unit. The host microprocessor coordinates message passing. No node microprocessor may use the bus until the host microprocessor sends a polling message allowing the node microprocessor access. More particularly, the host microprocessor supervises the overall system bus activity and through appropriate polling messages prevents bus contention by multiple nodes. That is, it prevents multiple nodes from simultaneously sending messages over a common bus. As a result, communications and functional operations are simplified for a quick transmission and validation of messages. Additionally, the system software may be amended to improve or alter the operation of the system and thereby so customize the system to a particular retailer's product displays.

Conventional communication systems require more complicated and expensive electrical circuitry with a resulting loss in reliability. Practical parallel binary systems require six or more data conductors in the bus as well as dedicated decoder circuits at each product selector. Serial pulse train systems use a single conductor that requires dedicated pulse train processors at each selector. Electrical interlock systems, typical of state of the art button-per-product switchers, use complex circuitry at each selector. In short, the present serial binary data transfer system represents a significant advance over these conventional systems.

In accordance with yet another aspect of the present invention, the central control unit includes a means for addressing the plurality of nodes. More particularly, following system installation each node is assigned a unique address for purposes of identification and individualized communication between the host microprocessor and the individual node microprocessors. Once the addressing mode of operation has been entered, the host microprocessor of the central control unit will not exit the addressing mode or poll other product groups for requests for service until all the nodes within the selected product group have been assigned an address.

The central control unit also includes a means for monitoring the nodes to confirm that an electronic product is connected to each node. Detection is accomplished by sending a "probe" pulse from a probe amplifier on a bus chosen by the node communications multiplexer. If a product is present at the particular node being monitored as identified by its unique address, the pulse is shorted out by the presence of the product chassis ground. Accordingly, no pulse is read back through the multiplexer. A pulse is, however, read back if no product is present. In, for example, an audio electronic product system, this monitoring allows the central control unit to confirm the presence of sources including, for example, tape decks, compact disc players and tuners as well as other electronic product groups including, for example, amplifiers, and equalizers.

In accordance with still another aspect of the present invention, the switching network includes, in cooperation with the host microprocessor of the central control unit, a means for providing power to two and only two electronic products connected to the node means within a given electronic product group. This allows instantaneous comparison of the two powered products. Further, this is possible while also conserving power through the interruption of the power supply to the other products within the given product group. This is particularly advantageous in switching networks used to demonstrate car audio systems as it allows one to control and conserve power from the system D.C. power supply consumed by amplifiers.

In accordance with yet another aspect of the present invention, a new and improved method of interconnecting selected products of different electronic product groups on display is provided. This method is performed utilizing the switching network already described. The method includes the step of assigning an unique address number to each node and, therefore, each connected electronic product. This allows the individual nodes and electronic products to be identified by a central control unit for system communication and selection of operation.

The method also includes the step of polling the nodes for work in order to solicit request for service messages from the nodes to the central control unit. More particularly, as described above, each node includes a cooperating product selector button and switching mechanism. When the button is activated and a "poll for work" message has been issued by the host microprocessor, the cooperating node microprocessor at that node sends a request for service message to the host microprocessor. The host microprocessor then operates upon the request for service message, sending a signal to the node microprocessor that activates the switch to interconnect the corresponding electronic product into the multiproduct system being established for active demonstration.

In a situation where two or more selector buttons are simultaneously depressed within a group, multiple node microprocessors will send a request for service message to the host microprocessor in response to a polling message. The message received by the host microprocessor in this instance will be unrecognized or misaddressed. The host microprocessor ignores such garbled messages and takes no action. When the user sees that the desired function has not been accomplished, the user simply needs to depress the appropriate selector button again to achieve the desired result.

The method also includes the sending of product control commands from the host microprocessor of the central control unit to the node microprocessor of the nodes. Those electronic products selected for demonstration by request for service messages from the product selector buttons in the nodes and/or the product selectors in the control terminal are then interconnected. In this way, a multi-product system is established for active demonstration of the selected electronic products.

The method also includes further additional steps that significantly enhance the power and flexibility of the system with respect to choice of product demonstration nodes and operational features. More particularly, the method includes polling of the node microprocessors to solicit address request messages from the nodes to the central control unit. More particularly, when an electronic product is connected to a node and node microprocessor that have not been previously assigned a unique address, an address request message is sent along the bus to the host microprocessor of the central control unit. The central control unit then provides the node and cooperatively connected electronic product with the unique address so as to allow the host microprocessor to establish and maintain communication with that node. In this way, interconnection of the cooperating electronic product into a selected multi-product system for active demonstration is possible.

Additionally, the provision of such a "real-time" address assignment feature accommodates system expandability. That is, additional nodes and products can be added to the system without requiring any modifications in the system software.

As also discussed above, the method includes the step of monitoring the presence of an electronic product connected to a node. More particularly, the central control unit may send out a probe pulse on the buses. If a product is present and operatively connected to any node of the bus selected for measurement by a multiplexer, the pulse is shorted out by the presence of the product chassis ground. Accordingly, no pulse is read back through the multiplexer. However, in a situation where no product is present, the pulse is read back. This feature is also useful for system diagnostics to determine if an electronic product is properly connected to the node.

In accordance with the present method, upon system power-up the switching network is returned to its last operative condition with the selected products themselves interconnected for demonstration as a multi-product system.

In accordance with additional aspects of the present invention, the method includes the acknowledging of a product control command by sending an acknowledgement message from the node microprocessor, to which the command was directed, to the host microprocessor. This step is done to insure proper communication along the two-way bus between the central control unit and the nodes.

Additionally, the method includes a step of maintaining power to two and only two electronic products in a single product group, such as amplifiers, so as to allow instantaneous comparison of the two powered products. This is accomplished while also conserving power through the interruption of power to the other products in the specific product group.

Still other objects of the present invention will become readily apparent to those skilled in this art from the following description wherein there is shown and described a preferred embodiment of this invention simply by way of illustration of one of the modes best suited to carry out the invention. As it will be realized, the invention is capable of other, different embodiments, and its several details are capable of modifications in various, obvious aspects all without departing from the invention. Accordingly, the drawings and description will be regarded as illustrative in nature and not as restrictive.

BRIEF DESCRIPTION OF THE DRAWING

The accompanying drawing incorporated in and forming a part of the specification, illustrates several aspects of the present invention, and together with the description, serves to explain the principles of the invention. In the drawing:

FIGS. 3a–3c are simplified block diagrams respectively detailing a source node, an amplifier node and a speaker node of the switching network shown in FIG. 1 presented for purposes of illustration of the present invention;

Reference will now be made in detail to the present preferred embodiment of the invention, an example of which is illustrated in the accompanying drawing.

DETAILED DESCRIPTION OF THE INVENTION

Figure 1:
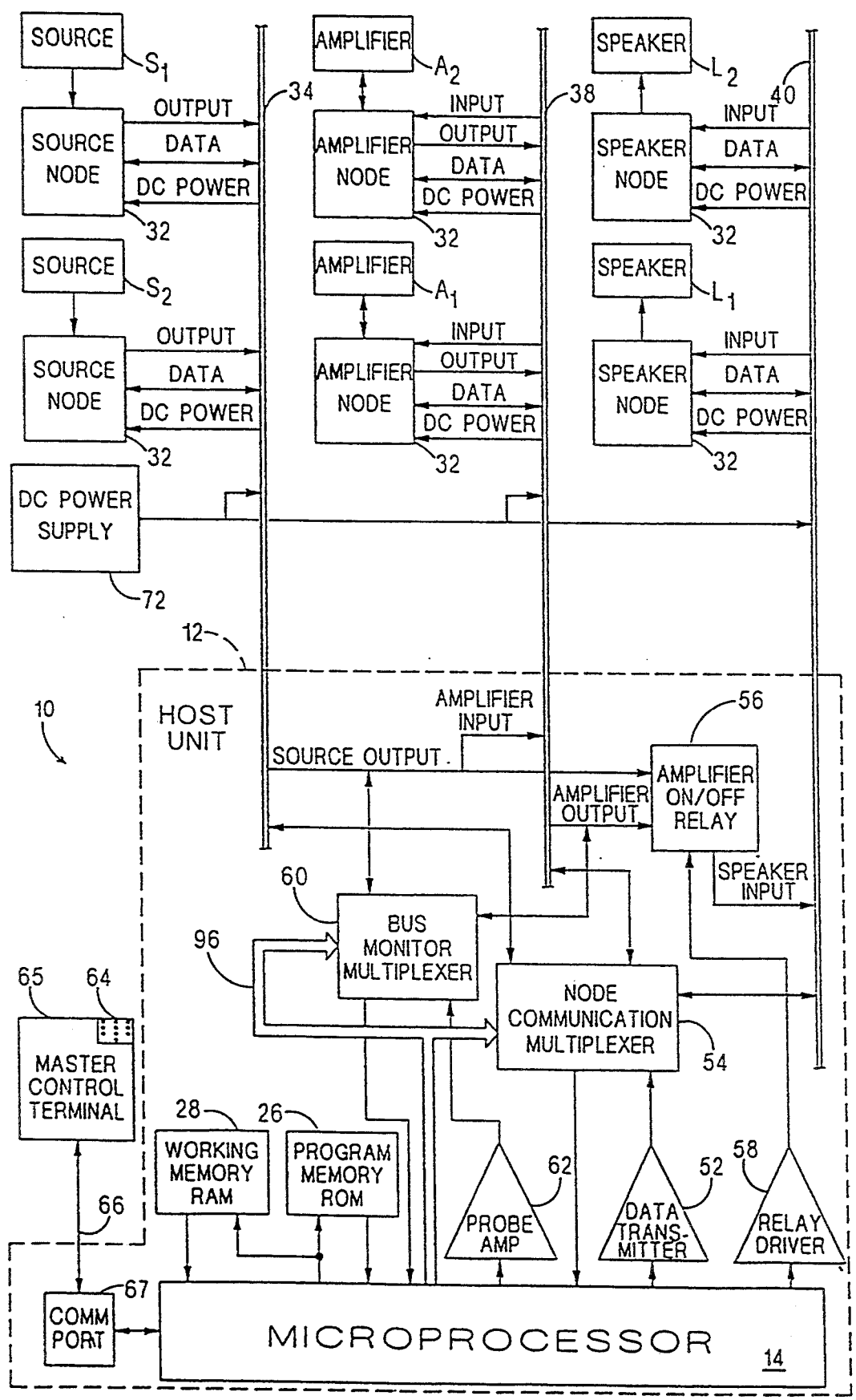
FIG. 1 is a simplified block diagram of the switching network of the present invention.

Reference is now made to the drawing figures, and particularly, FIG. 1 schematically showing the switching network 10 of the present invention. The switching network 10 is described below with reference to the interconnecting of various electronic products for active demonstration of an automobile audio system. In particular, electronic products from various groups including a source group, an amplifier group and a speaker group are interconnected to form an automobile entertainment system that may be fully demonstrated and selectively compared with other products selected from these groups. It should be recognized that products from other groups may also be interconnected to form the entertainment system being demonstrated. Such product groups could include equalizer, rear amplifier, rear speaker, subwoofer amplifier, subwoofer, center channel amplifier and center channel speaker.

It should be further recognized that the present switching network is not limited in application to automobile audio systems but may be, in fact, adapted to other applications including, but not limited to, home hi-fi products such as digital disc players, tape recorders, stereo receivers, equalizers, speakers, etc. Interconnection of video products such as cameras, recorders, processors, monitors, etc. is also anticipated by the present invention. Similarly, home theater products that combine audio and video along with products such as movie sound processors and ambience processors could be demonstrated as well. Telephone, computer and home security products might also be interconnected utilizing this switching network and method. In fact, the present switching network 10 and method may be utilized to interconnect virtually any electronic product likely to be displayed and/or interconnected with related products in a retail store.

As best shown in FIG. 1, the switching network 10 includes a central control unit generally designated by reference numeral 12. At the heart of the central control unit 12 and the switching network 10 is a host microprocessor 14 for controlling and supervising all network functions. The host microprocessor 14 may, for example, be a microcontroller such as a Motorola MC68HC11F1 unit. Appropriate software support defining the logic of the network as a whole is stored in a program memory ROM 26, such as Audio Authority part #123-006 read only memory integrated circuit. Such software is available from Audio Authority Corporation, Lexington, Ky.

Figure 2:
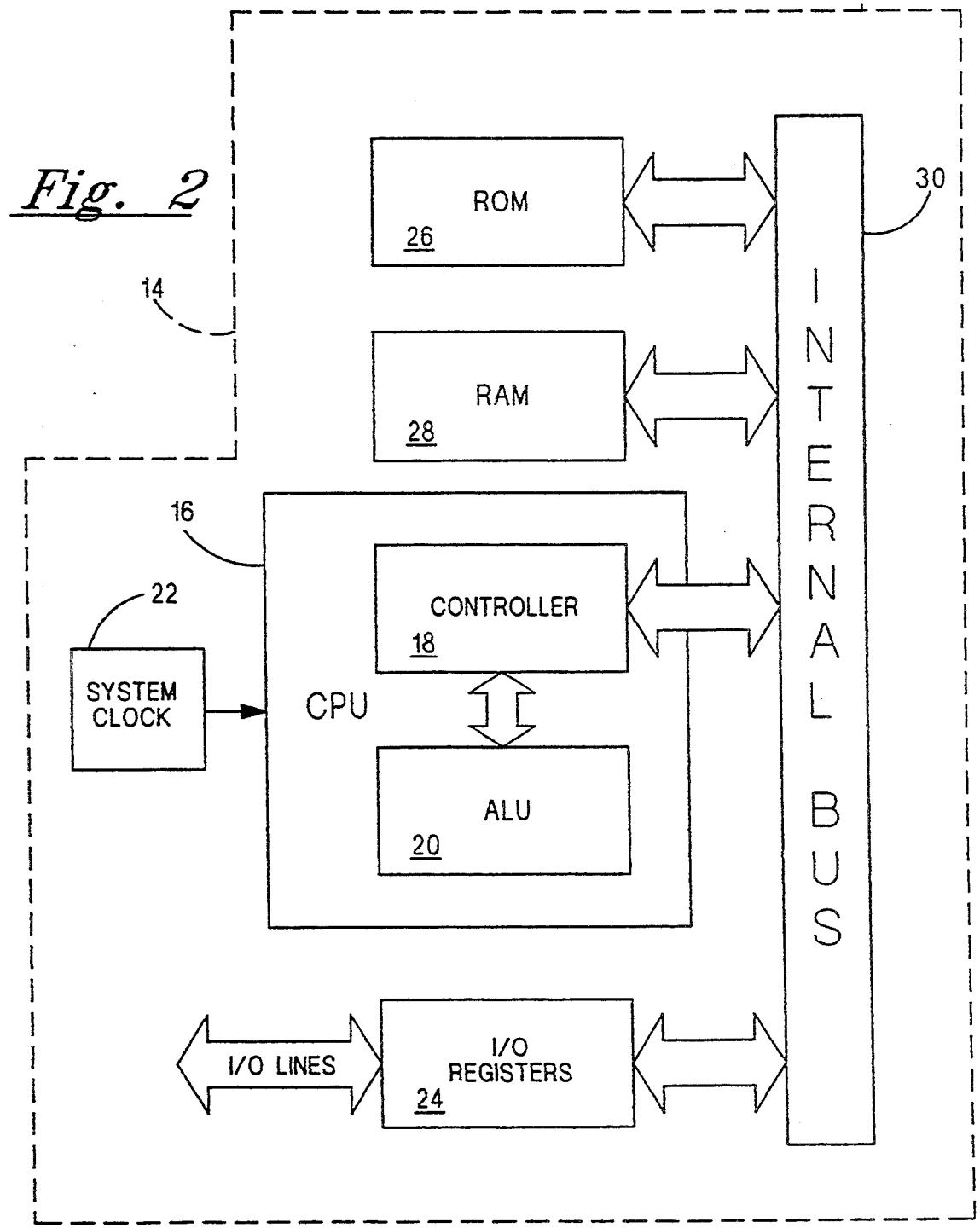
FIG. 2 is a simplified block diagram detailing the host microprocessor of the central control unit of the switching network shown in FIG. 1.

As best shown in FIG. 2 and known in the art, the host microprocessor 14 includes a central processing unit or CPU 16 having a controller 18 to supervise operation and an arithmetic logic unit or ALU 20 for mathematical and logic functions. A system clock 22, operatively connected to the central processor unit 16 synchronizes all operations.

The host microprocessor 14 also includes input and output registers 24 to send and receive data, read only memory or ROM 26 for program storage, and random access memory or RAM 28 for temporary data storage. The system clock 22, ROM 26 and RAM 28 may be physically inside or outside the host microprocessor integrated circuit. An internal bus 30 allows communication between the various components of the host microprocessor 14.

As shown in FIG. 1, the central control unit 12 is interconnected with a plurality of electronic product nodes 32 by means of a bus system. As shown, one bus is provided to interconnect each electronic product of a product group. Hence, in the exemplary switching network 10 being described, there is provided a source bus 34, an amplifier bus 38, and a speaker bus 40. As also shown, one source $S_1, S_2 \ldots S_N$ is connected to each source node 32, one amplifier $A_1, A_2 \ldots A_N$ is connected to each amplifier node 32 and one pair of speakers $L_1, L_2 \ldots L_N$ is connected to each speaker node 32. Further, each source S, amplifier A and speaker L on display in the retail store is connected to an appropriate node 32. The total number of sources, amplifiers and speakers that may be interconnected into the system through the source, amplifier and speaker busses 34, 38, 40, respectively, is essentially unlimited but for practical purposes may be up to 99. For purposes of illustration, only two of each product group are shown in FIG. 1, and they are numbered with subscripts 1 and 2 for purposes of identification when describing the operation of the switching network 10.

Each bus 34, 38, 40 provides all signal paths to and from an electronic product including, in the exemplary system being described: audio signal lines for product input and output, DC power lines for supplying power to products that require it and to the nodes themselves and data lines for two-way communication between host microprocessors 14 and node microprocessors 42 (described in detail below). Accordingly, installation of the switching network 10 is simplified. Except for the cutting of display panels, no tools or special skills are required. No DIP switches need to be set or confusing procedures followed. Each group of product selection nodes 32 is connected to the central control unit 12 by a single bus 34, 38, 40 that runs through multiple product selection sites without interruption. As a result of this design, faster, easier installation is provided with the highest interconnection reliability available.

Diagnostics enable detection of product hook-up and system interconnect problems so the installer may quickly check a system and isolate erroneous wiring, dead products and even the unlikely instance of faulty switching network units. Repair of faulty units is a simple plug-in replacement. A self prompting readaddressing program (described in detail below) completes the repair/installation process without having to access code sheets or work with DIP switches.

Figure 3A:
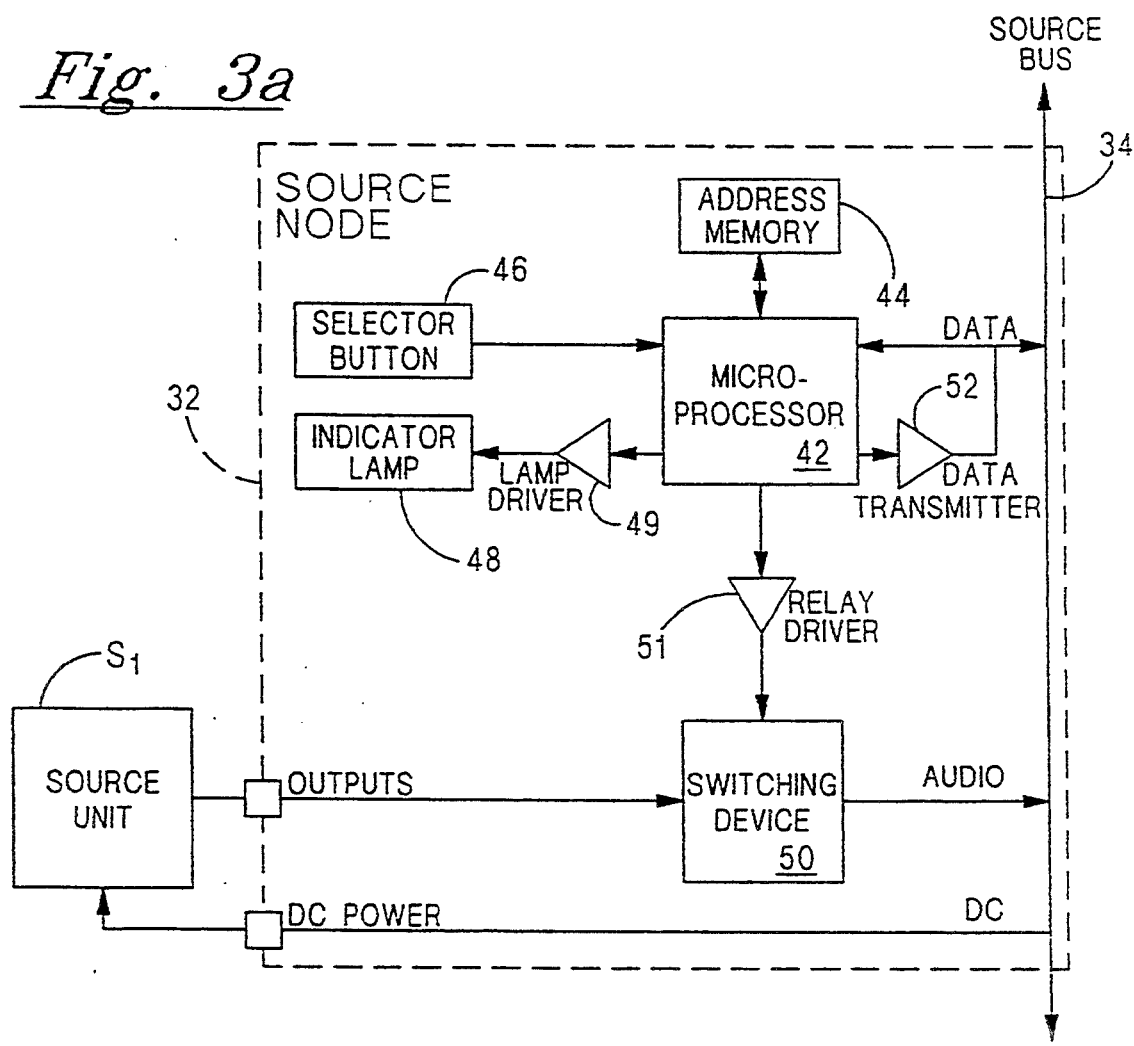

Reference is now made to FIG. 3a showing in detail one source node 32. This source node 32 is representative of all the source nodes 32 interconnected to the source bus 34. As shown, the source node 32 includes a node microprocessor 42. The node microprocessor 42 is a class of microprocessor having all of the support functions such as the clock, ROM and RAM included on the integrated circuit. For example, the node microprocessor may comprise a microcontroller such as a Motorola MC68HC05J1 incorporating the node program and available as Audio Authority Part #123-005. Complex electrical circuitry is replaced in the present system through the utilization of the node microprocessors 42.

Each source node 32 also includes an address memory EEPROM 44. The address memory EEPROM 44 is particularly adapted for storing a unique address that is utilized to identify the particular source node 32 and connected electronic product (in this case, source $S_1$) so as to allow the operation of the present switching network 10.

More particularly, each memory EEPROM 44 contains three values used by the associated node 32 plus a byte indicating whether the values are valid. The node address, byte and ID code combine to uniquely identify the node 32 in the switching network 10. Further, utilizing a memory EEPROM 44, which is both non-volatile and electrically erasable, enables the node 32 to retain its unique address after power-down, yet allows the address to be reprogrammed, if necessary, by appropriate message sequences from the central control unit 12.

Each source node 32 also includes a cooperating product selector switch in the form of a selector button 46. When activated, the selector button 46 allows a customer to select the electronic product, such as Source $S_1$, for demonstration. The selection of the product is indicated by an indicator lamp 48 actuated by the associated node microprocessor through the lamp driver 49. Illumination of the lamp 48 indicates that the electronic product connected to the node 32 in question, is interconnected and actively being demonstrated. One indicator lamp 48 is provided operatively connected within each node 32.

Each node 32 also includes a switching device 50, such as a SoloSwitch, solenoid actuated switch available from Audio Authority. Relays or other switching devices known in the art may also be utilized. The switching device 50 is actuated by the associated node microprocessor 42 through the relay driver 51. The switching device 50 operatively connects the input and/or output of the electronic product connected to the node 32 with the signal line of the bus 34 so that the product $S_1$ may be demonstrated. As should be appreciated, the address memory EEPROM 44, selector button 46, indicator lamp 48 and switching device 50 all operate in response to the cooperating node microprocessor 42 of each node 32. As further described in detail below, each node microprocessor 42 is in operative communication with the host microprocessor 14 of the central control unit 12 through the data line of the appropriate bus 34, 38, 40.

Figure 3B:
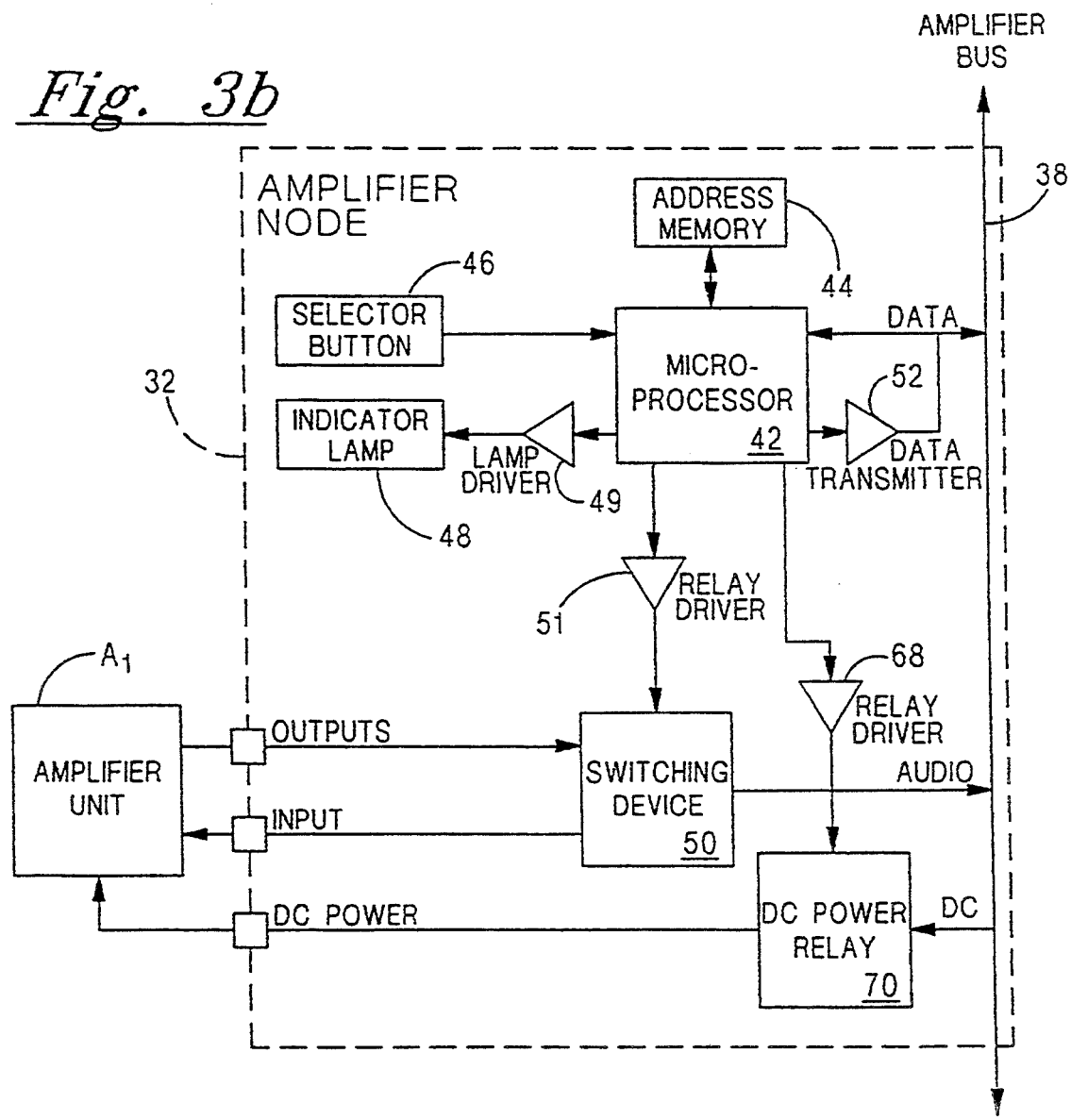

Similarly, as shown in FIG. 3b, each amplifier node 32 includes a node microprocessor 42, address memory EEPROM 44, a selector button 46, an indicator lamp 48 and switching device 50 (other features of the amplifier node are described below). So does each speaker node 32 (see FIG. 3c).

The method of operation of the switching network 10 of the present invention will now be described in detail with reference to the drawing figures. With respect to this operation, it is important to note that the central control unit 12, through the host microprocessor 14, supervises all system and product selector functions. It is also the terminal for all data and product audio signal transfer. Additionally as indicated above, one node 32 is provided per product being displayed. The node 32 functions to connect the product to the appropriate bus 34, 38, 40 upon the command of the central control unit 12. It should also be recognized that each bus 34, 38, 40 services one product group. Each bus 34, 38, 40 may be linear or branched and allows for bidirectional communication between the host microprocessor 14 of the central control unit 12 and each node microprocessor 42 of the nodes 32.

The central control unit 12 and, more particularly, the host microprocessor 14, operates methodically in response to electrical stimuli using the program stored in its program memory integrated circuits ROM 26. More particularly, the program is a sequence of instructions that instructs the host microprocessor 14 what to do. The host microprocessor 14 responds only to a predetermined, coded group of instructions called "op codes". Each instruction step of the program contains an op code that causes a specific action to be taken by the host microprocessor 14. The host microprocessor 14 executes each instruction in the program listing sequentially. When the host microprocessor 14 reaches the end of the program, the last instruction readies it to receive a new input stimulus that starts program execution again.

The host microprocessor 14 receives and sends information through its input/output registers 24 including input and output lines leading to the data lines of buses 34, 38, 40. Data is passed on one data line of each product group bus. Serial binary format is used. This format is easy to encode and decode using a program. It also allows for built-in error detecting and correcting software that eases performance requirements in the electrical circuits. Because data is passed in a binary format, there is no need for expensive matched impedance transmission lines, shielding or complex receive/transmit circuitry in the switching network 10 of the present invention. As a further advantage, the switching network 10 utilizes cheap, unshielded twisted pair cable as the transmission medium. The utilization of serial format advantageously reduces the number of bus lines required, thereby improving reliability and lowering bus costs.

The host microprocessor 14 and node microprocessors 42 are all capable of sending and receiving information on the buses 34, 38, 40. In this type of network configuration, simultaneous transmission by multiple sources is destructive and permitting the node microprocessors 42 to communicate asynchronously is, therefore, infeasible. A rigid protocol is required to ensure reliable and accurate information transfer between the host microprocessor 14 and the node microprocessors 42, controlling access to the busses and thus avoiding data collisions or, as more commonly known, bus contention. Further, the node microprocessors 42 must only be allowed to send data on the busses 34, 38, 40 when the host microprocessor 14 is listening and ready to receive.

The best way to achieve this end is to adopt a master-slave communications strategy managed by the host microprocessor 14. In this type of architecture, the host microprocessor 14 acts as a "traffic cop" or bus arbiter to coordinate message-passing on the data lines of the busses 34, 38, 40. No node microprocessor 42 may use the data lines of the busses 34, 38, 40 until the host microprocessor 14 sends a polling message allowing the node microprocessors access to the busses 34, 38, 40. This allows the host microprocessor 14 to sequence network communications to fit its own workload.

Due to the workload of the host microprocessor 14 and the hardware configuration used, the expected throughput of the busses is ten thousand bits per second. This bit rate is not rapid enough to allow the host microprocessor 14 to individually poll each of the node microprocessors 42 and still maintain a reasonable rate of response to user commands. Instead, the host microprocessor 14 polls each product group globally to solicit messages from the node microprocessors 42.

As shown in FIG. 1, the central control unit 12 also incorporates a node communication multiplexer 54 specifically adapted for directing communications between the host microprocessor 14 and the individual node microprocessors 42 along the busses 34, 38 and 40. The host microprocessor 14 is programmed to transmit a message only if the data line of a bus 34, 38 or 40 is clear. The host microprocessor 14 further monitors the data line of each bus 34, 38, 40 while transmitting any message. Any differences or errors are likely to have been caused by coincidental transmission with one or more of the node microprocessors 42. In the event an error is detected, the host microprocessor 14 retransmits the desired message after a random delay to make a second coincident transmission improbable.

Figure 4:
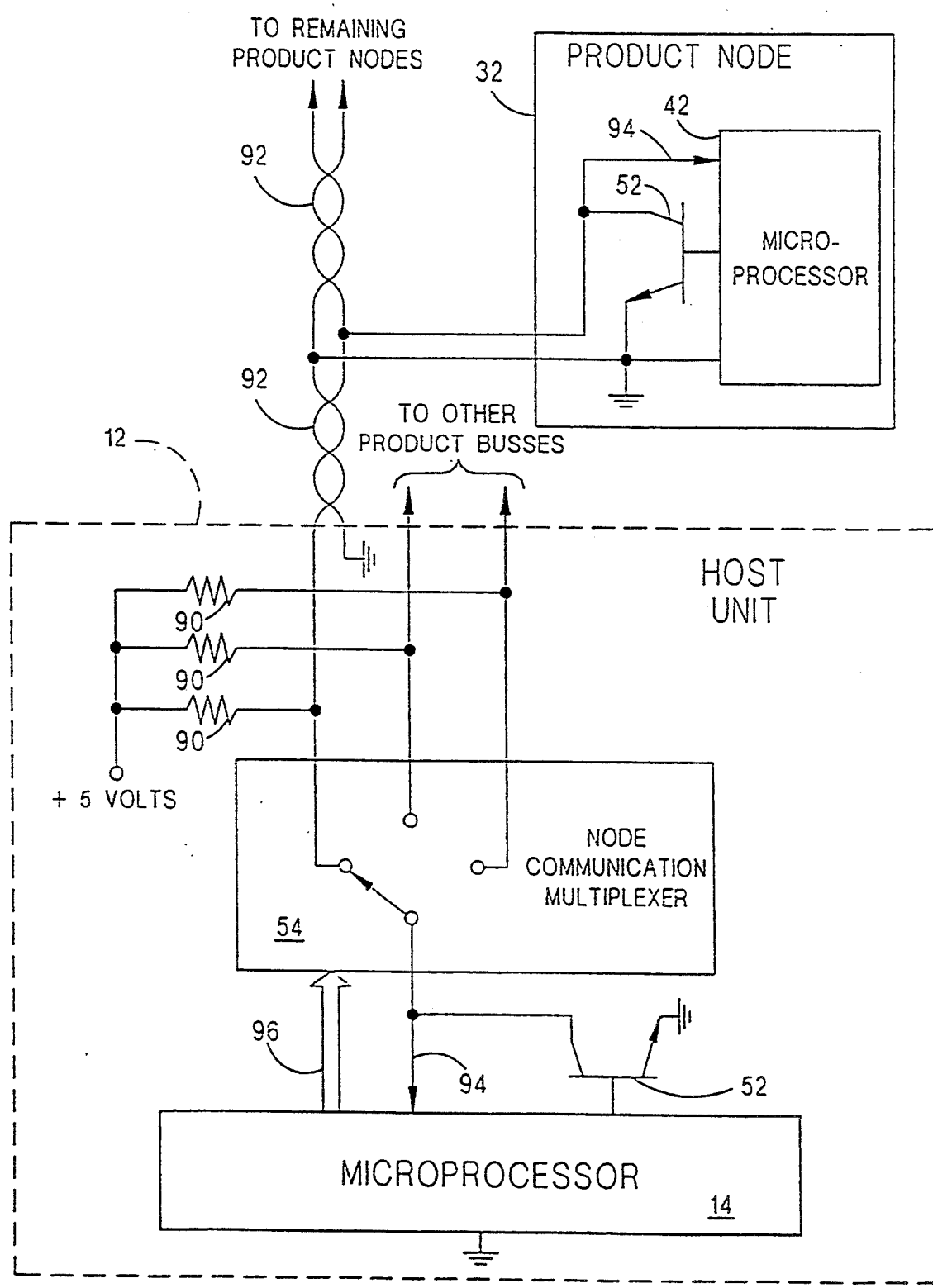
FIG. 4 is a schematic representation of the node communication subsystem, detailing the node communication multiplexer, data transmitters and data bus shown in FIG. 1.

As shown in FIG. 4, communications between host Unit 12 and nodes 32 is implemented using open collector transistors 52 transmitting via twisted pair cable 92 to a multiplicity of microprocessor input lines 94 operating as receivers. A pull up resistor holds each product group data line at positive 5 volts which represents logical "0". Host microprocessor 14 selects a product group with which to communicate by sending an address value to node communication multiplexer 54 via multiplexer address bus 96. The multiplexer 54 connects the twisted pair data line 92 of the product group of interest to data input 94 and data transmitter 52 of host microprocessor 14. Data sent by any transmitter 52 reaches all nodes 32 of the selected product group and host 12 simultaneously.

The messages passed on the data lines of a bus 34, 38, 40 are comprised of variable length bit strings. Each bit can have one of two logic values: "1" or "0". The idle or inactive state of the line, which exists when no host microprocessor 14 or a node microprocessor 42 is communicating, has a physical value of +5 volts and a logical value of "0". The active state exists when the data line of the bus 34, 38, 40 is held low (physical 0 volts or ground level and logic value of "1") by the host microprocessor 14 or a node microprocessor 42 for one communications clock cycle (100 microseconds).

All command messages sent from the host microprocessor 14 reach data receiver inputs of all of the nodes 32 and the central control unit 12. The command message received is only processed by the node microprocessor 42 to which the message is addressed. Command messages going out from the host microprocessor 14 to the node microprocessor 42 carry specific data in a segmented format. The format includes a message code and a node address. The message code is the specific instruction that the central control unit 12 is requesting be carried out by the node microprocessor 42. The node address indicates the node that is being directed to carry out the instructions. A zero address is acted upon by all nodes.

Command messages from the host microprocessor 14 of the central control unit 12 may include:

1) Enable-prepares a node or nodes 32 in a product group to receive instructions;

2) Disable-deselects the product of a node 32 and prevents further selection;

3) Poll for unaddressed nodes—asks unaddressed nodes 32 to reply so addressing routine may be initiated if any unaddressed nodes are present;

4) Poll for work—asks nodes 32 needing service to state their request;

5) Enter address mode—instructs all modes 32 to erase present addresses and prepare to receive new addresses;

6) Enter normal mode—instructs nodes 32 to load their previous address, if any and to begin processing commands;

7) Are you there—asks if unaddressed node 32 is present in a given product group;

8) Request status—asks a particular node 32 to report its present activity;

9) Assign address—sends a particular node 32 a new address in reply to request address message;

10) Product control—tells the node what connection state to assume, i.e., off, on, ready.

Messages coming into the host microprocessor 14 of the central control unit 12 from the node microprocessors 42 pass through the multiplexer 54 and are read directly by the host microprocessor 14 using one line or bit of its input/output registers 24. These messages also adhere to a specific format. The format includes a message code, a node address and a status code. The message code is the service request to be performed by the host microprocessor 14. The node address identifies the node sending the request and the status code provides information about the node's current activity.

Node messages to the central control unit 12 are defined as follows:

1) Command acknowledgement—tells the host microprocessor 14 if the previously requested instruction was successfully executed in reply to a status request command;

2) Address assignment request—asks host microprocessor 14 to send new address in response to poll for unaddressed nodes command;

3) Request for service—tells the host microprocessor 14 that some action needs to be taken (e.g. a new product has been selected for play in reply to a poll for work command);

4) Product status response—sends node status in reply to request product status command;

5) Acknowledge presence—indicates that a node is present on a particular bus 34, 38, 40 in reply to a request presence command.

The host microprocessor 14 directs the routing of product input and product output signals among the signal lines of the node busses 34, 38, 40. In the embodiment shown in FIG. 1, the amplifier on/off relay 56 selects either the immediate source output or the amplified version of the output for delivery to the speakers L.

Driver amplifiers such as the relay driver 58 allow the host microprocessor 14 to control the relay 56.

The host microprocessor 14 also monitors the switching activity by the nodes 32 connected to the bus 34, 38, or 40 over which the host microprocessor is communicating through the bus monitor multiplexer 60. More particularly, the host microprocessor 14 detects whether a bus 34, 38, 40 has a product connected to it or is clear. In this way, multiple product selections are prevented due to node 32 switching errors.

The bus monitor multiplexer 60 also monitors the same node bus 34, 38, 40 with which the host microprocessor 14 is communicating. Initially, the probe amplifier 62 sends a test pulse on all buses simultaneously. The pulse amplitude of the bus currently being serviced is read by the host microprocessor 14 through the multiplexer 60. A low amplitude indicates that the selected product is present on the bus 34, 38, 40. The low amplitude results from the product's low output resistance shorting the pulse to the ground. A high amplitude indicates no product present as the open bus allows the pulse to appear at its full amplitude.

Figure 5:
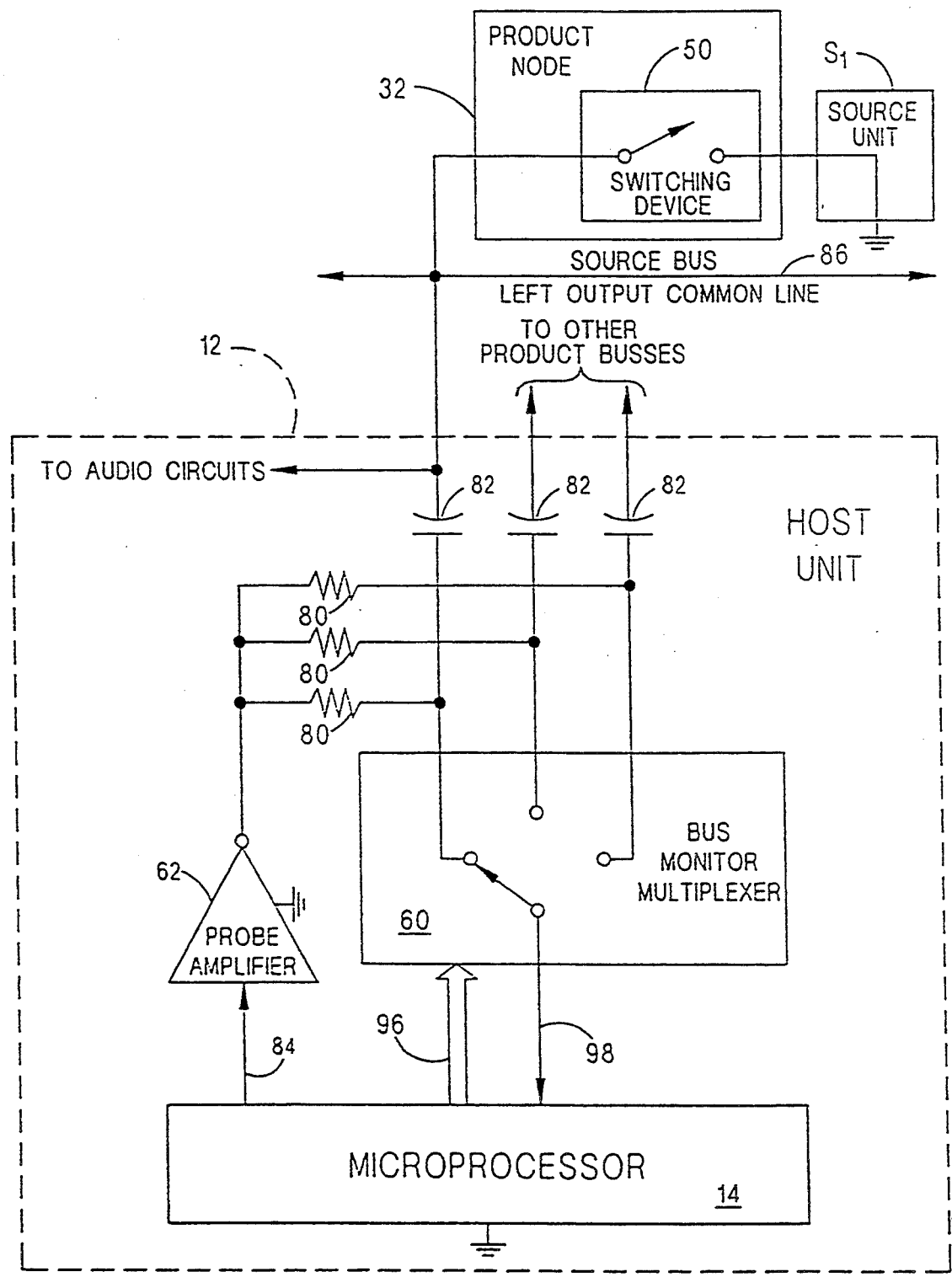
FIG. 5 is a schematical representation of the bus monitor subsystem, detailing the probe amplifier, bus monitor multiplexer and related circuitry shown in FIG. 1.
Figure 6:
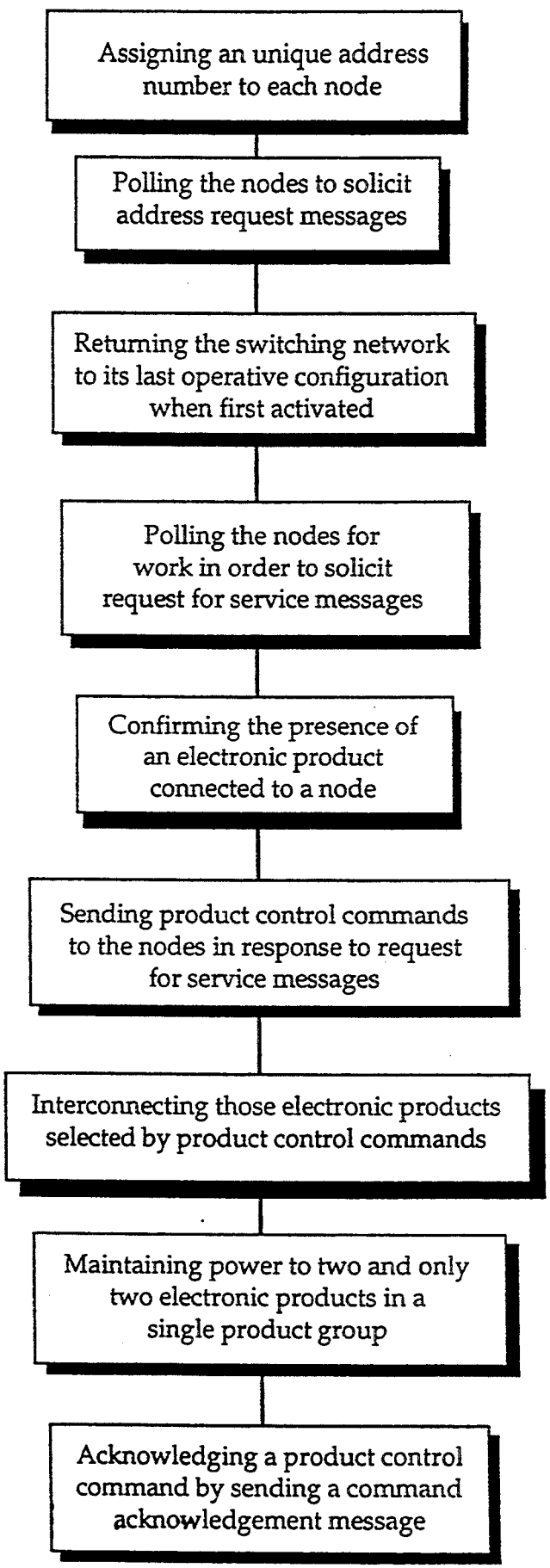
FIG. 6 is a block diagram showing the method of operation of the apparatus of the present invention.

More particularly, FIG. 5 shows an electrical configuration where a voltage pulse, defined by the host software and appearing on microprocessor 14 output line 84, is sent to probe amplifier 62. The amplified pulse is applied to left channel audio common line 86 of all powered products via current limiting resistors 80 and coupling capacitors 82. Host microprocessor 14 selects one product bus 34, 38, 40 for testing by placing an address value on multiplexer address bus 96. For example, if any product $S_1$ is presently connected to bus 34, the current developed by probe amplifier 62 and resistor 80 flows through audio common line 86, selector relay 50 and product $S_1$ chassis to dc common; hence, the pulse that appears on microprocessor input line 98 has little amplitude. Host microprocessor 14 interprets the low pulse amplitude as "product present". If, on the other hand, no product is connected to the bus 32, nearly the full pulse amplitude is presented to the microprocessor input line 98 and host microprocessor 14 interprets the high pulse amplitude as "product absent".

As indicated above, the host microprocessor 14 supervises all system functions and directs node 32 operations. The host microprocessor 14 commands node microprocessors 42 to connect and disconnect products connected to their respective nodes 32. This is done alternatively through operation of the product selector buttons 46 at the nodes 32 or through activation of a second set of product selectors 64 (such as a numeric pad) located on an optional master control terminal 65.

The control terminal 65 may include a display showing, for example, products being demonstrated, a second group of products ready for comparison individually or as a group, instructional prompts and system status information. A keyboard including function keys may also be provided. The keyboard allows quick access to products in desired groupings. Bidirectional communication between the control terminal 65 and the control unit 12 may be via a serial data link 66 and through a RS-232 serial port 67.

The host microprocessor 14 executes a cyclical routine during normal operation that enables it to monitor all incoming data and perform the required operations in response to that data. This routine consists of: (1) polling a product group for work; (2) executing a work dialog with any node 32 that has requested service; (3) updating the state of functional components resident in the host unit such as amplifier on/off relay 56; (4) testing for error conditions using the available status information; (5) enabling serial communications port 67 to receive instructions from master control terminal 65; (6) sending updated system and product status data and error messages to terminal 65; and (7) incrementing the multiplexer address by one to prepare for the next cycle. This routine is repeated indefinitely using a new product group during each cycle.

Hence the host microprocessor 14 not only receives but may also retransmit system status information from both the nodes 32 and the internal monitors of the central control unit 12 to the control terminal 65 for display. Further, the host microprocessor 14 supervises the node addressing routine described in detail below.

When power is first applied at the time the switching network 10 is originally installed in a retail store, all nodes 32 assume the disabled mode. The microprocessor 14 issues the are you there command to each product group in turn to detect the presence of nodes 32; nodes reply with the acknowledge presence message. Microprocessor 14 then issues the poll for unaddressed nodes command globally to the nodes 32 of the first product group. Unaddressed nodes reply with an acknowledge presence message, and the microprocessor 14 broadcasts the Enable command to all nodes 32 in the group. The microcontroller 42 of each unaddressed node 32 then begins blinking its associated indicator lamp 48; the operator responds by pressing the selector button 46 of the node 32 that is to receive the first node address of the group. Microprocessor 14 then sends the Poll for Work command to solicit requests for addresses from the nodes 32. The node 32 selected by the operator replies with an address assignment request message and the host microprocessor 14 replies with an assign address command bearing the new address value. The microcontroller 42 of the selected node 32 places the new address value in its address memory 44. The microprocessor 14 continues to poll and address the nodes 32 in the first product group in the manner described until all are addressed, then performs the same process for the remaining product groups until every node 32 has an address and the addresses within each product group are unique. The microprocessor 14 then enters the normal mode of operation.

Each time power is applied after the initial installation, a similar process of polling and addressing takes place to account for servicing or other changes that might have been performed while the system was shut down. When switching network 10 is powered up at the beginning of a business day, for instance, all nodes 32 assume the disable mode. The microprocessor 14 checks each product group for the presence of nodes by issuing an are you there command. Nodes reply with the acknowledge presence message. Microprocessor 14 then issues the poll for unaddressed nodes command to each product group. If any node in a given group replies with an acknowledge presence message, the microprocessor 14 enables all nodes 32; the indicator lamps 48 of those nodes 32 which are unaddressed begin flashing. The microprocessor 14 looks for holes in the address list for the group by sending an are you there message to each node address sequentially. When it finds a vacant address, i.e., where no reply is received, it sends a poll for work command. Meanwhile, the operator has manually selected one of the nodes 32 having a flashing lamp to be the next node to receive an address, and its microcontroller 42 replies to the poll for work command with an address assignment request message. Host microprocessor 14 then sends an assign address command bearing the new address value which is memorized by the node 32 that sent the request. The polling and addressing process is repeated until no unaddressed nodes remain. Microprocessor 14 then goes to normal mode operation.

During normal operation, the host microprocessor 14 of the central control unit 12 manages the selection and activation of the products attached to the individual nodes 32. The host microprocessor 14 utilizes its RAM 28 to keep track of the current active and standby nodes 32 in each group and is responsible for patrolling all the state changes within the nodes 32 in response to operator requests through the selector buttons 46 or the optional selectors 64. The host microprocessor 14 makes all decisions regarding the state of the nodes 32. The only time that a node 32 requests the attention of the host microprocessor 14 is when a product selector button 46 has been pressed and then it only does this in response to a poll for work command service query from the host microprocessor 14.

Upon first entering normal mode, the host microprocessor 14 restores the previous product selection states for any group that has not been readdressed. The network status is determined from the available resources and the indicator lamps 48 are updated accordingly. Thus, for example, if the previous product selection state had source $S_1$ connected through to amp $A_1$ driving loudspeaker pair $L_1$, these products are again interconnected to form a multiproduct demonstration system. This system plays until a customer or sales personnel wish to select other products for demonstration by activating either a selector button 46 at one of the nodes 32 or the second set of product selectors 64 at the main control terminal 65.

More particularly, host microprocessor 14 in normal mode polls the nodes 32 to solicit request for service messages from the nodes to the central control unit 12. Such a message is produced when the selector button 46 of another product such as Source $S_2$ is depressed. Accordingly, a request for service message is sent to the host microprocessor 14 by the node microprocessor 42 of node 32 connected to Source $S_2$. The host microprocessor 14 replies with a product control "off" message addressed to the node microprocessor 42 at node 32 connected to source $S_1$. The audio connection between the source $S_1$ and the bus 34 is terminated and associated indicator lamp 48 is extinguished. Then the node microprocessor 42 associated with the source $S_1$ sends a command acknowledgement message over the bus 34 to the host microprocessor 14. The host microprocessor 14 then checks that the bus 34 is clear, utilizing the bus monitor multiplexer 60. The host microprocessor 14 then sends a product control "on" message to the node microprocessor 42 at node 32 connected to source $S_2$. Audio connection between the source $S_2$ and the product signal line of bus 34 is established. The indicator lamp 48 at that node 32 then illuminates to show that the newly selected source $S_2$ is active and being demonstrated. Substantially simultaneously, the node microprocessor 42 associated with the source $S_2$ sends a command acknowledgement message to the node microprocessor 14. Similar events take place if the selection of source $S_2$ is made utilizing the product selectors 64 of the master control terminal 65 monitored by the host microprocessor 14. More particularly, activation of the appropriate product selector 64 sends a message to the host microprocessor 14 through the serial data link 66 and RS-232 serial port 67. The host microprocessor 14 then sends a command to disconnect source $S_1$ from the source bus 34. Compliance is verified through receipt of the appropriate command acknowledgement message and is further verified when a bus monitor pulse is returned via the bus monitor multiplexer 60. The host microprocessor 14 then commands the newly selected source $S_2$ to connect to the multiproduct system through the source bus 34. Again, compliance is verified through an appropriate command acknowledgement message and the bus monitor circuit.

The same series of steps are followed when another source or a different amplifier or speaker pair is selected utilizing either the selector buttons 46 at the nodes 32 or the product selector 64 at the master control terminal 65. The only difference is with respect to the amplifier circuit. As shown, each amplifier node 32 includes an additional relay driver 68 and a DC power relay 70. Under the supervision of the host microprocessor 14, these additional components allow a selected number such as the last two, amplifier selections to receive DC power from supply 72 so that they may be instantaneously compared without waiting for them to warm up or power up. Accordingly, power may be maintained to amplifier $A_1$ and amplifier $A_2$ simultaneously while amplifier $A_1$ is selected for demonstration and interconnection to the other selected products of the entertainment system. When amplifier $A_2$ is selected, it is already powered up and instantaneously operates to allow more convenient and effective comparison thereby enabling the consumer to be more confident in his purchase decision. The indicator lamp 48 of the amplifier node 32 of the powered-up but inactive amplifier unit blinks to show that it is ready.

In summary, numerous benefits result from employing the concepts of the present invention. The present switching network, based on a (master) host microprocessor 14, and (slave) node microprocessor 42 is more powerful and has a more flexible architecture than any switcher previously known in the art, digital or otherwise. This results in the switching network 10 of the present invention being more efficient and effective as a tool in selling electronic products. The switching network 10 is also relatively inexpensive to install utilizing single busses for audio, power and data transmission that may be extended or branched to interconnect all the nodes 32 to the central control unit 12. The switching unit 10 also includes a self-checking diagnostic program that tests all systems when it is powered up. Advantageously, the switching network 10 also returns to the same operational mode it was in when it was previously turned off. When powered down, memory power is also maintained to the sources and other products as necessary to maintain the product presets.

The foregoing description of the preferred embodiment of the present invention has been presented for purposes of illustration and description. It is not intended to be exhaustive or to limit the invention to the precise form disclosed. Obvious modifications or variations are possible in light of the teachings. For example, the switching network may include product selector controls either at the node or at the control terminal rather than in both places. Further, more than one product may be serviced by each node 32. The one product per node arrangement described above was only presented as an example of just one possible network architecture. The embodiment was chosen to provide the best illustration of the principles of the present invention and the practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A switching network for interconnecting selected products of different electronic product groups on display, comprising:
   a plurality of nodes, each product on display being operatively connected to one node, and each node including a cooperating product selector switch for selectively activating said cooperating connected electronic product;
   control means for supervising all network functions, said control means including a probe amplifier for confirming that any one of said nodes is connected to an electronic product;
   a control terminal operatively connected to said control means, said control terminal including product selector means for activating selected products connected to said nodes; and
   bus means for operatively connecting said plurality of nodes with said control means;
   whereby a multi-product system is established for active demonstration of the selected electronic products.

2. The switching network set forth in claim 1, wherein said bus means provides for all signal paths to and from an electronic product including product input and output signals, product power supply and all network control signals.

3. The switching network set forth in claim 1, wherein each node further includes a node microprocessor in two-way communication through said bus means with said control means, an address memory to identify said node and connected electronic product and a switching means responsive to said node microprocessor and control means to operatively connect said connected electronic product to said bus means.

4. The switching network set forth in claim 3, wherein said communication between said control means and said nodes is expressed in serial binary form.

5. The switching network set forth in claim 3, wherein each said node further includes an indicator lamp, illumination of said lamp indicating current selection of said electronic product connected to said node.

6. The switching network set forth in claim 1, wherein said control means includes a host microprocessor and a node communications multiplexer for directing communications from said host microprocessor along said bus means to said plurality of nodes.

7. The switching network set forth in claim 6, wherein said control means further includes means for addressing said plurality of nodes through said bus means.

8. The switching network set forth in claim 1, wherein said control means includes means for providing power to two and only two electronic products connected to said node means so as to allow instantaneous comparison of the two powered products while also conserving power.

9. The switching network set forth in claim 1, wherein said electronic product groups include sources, amplifiers and speakers and said bus means includes a source bus, an amplifier bus and a speaker bus.

10. A switching network for interconnecting selected products of different electronic product groups on display, comprising:
    at least one node, each product on display being operatively connected to one node and each node including a cooperating product selector switch for selectively activating said cooperating connected electronic product;
    control means for supervising all network functions, said control means including means for providing power to a selected number of electronic products connected to said at least one node while interrupting power to other electronic products of a particular product group so as to allow instantaneous comparison of the powered products while also conserving power; and
    bus means for operatively connecting said at least one node with said control means;
    whereby a multi-product system is established for active demonstration of selected electronic products.

11. A switching network for interconnecting selected products of different electronic product groups on display, comprising:
    control means for supervising all network functions, said control means including means for providing power to a selected number of electronic products connected to said switching network while interrupting power to other electronic products of a particular product group so as to allow instantaneous comparison of the powered products while also conserving power;
    a control terminal operatively connected to said control means, said control terminal including product selector means for activating selected products connected to said switching network; and
    bus means for operatively connecting selected products of the different product groups on display;
    whereby a multi-product system is established for active demonstration of selected electronic products.

12. A switching network for interconnecting selected products of different electronic product groups on display, comprising:
    a plurality of nodes, each product on display being operatively connected to one node, and each node including a cooperating product selector switch for selectively activating said cooperating connected electronic product;
    control means for supervising all network functions, said control means including means for providing power to any two electronic products connected to said nodes so as to allow instantaneous comparison of the two powered products while also conserving power;
    a control terminal operatively connected to said control means, said control terminal including product selector means for activating selected products connected to said nodes; and
    bus means for operatively connecting said plurality of nodes with said control means;
    whereby a multi-product system is established for active demonstration of the selected electronic products.

13. The switching network set forth in claim 12, wherein each node further includes an address memory to identify said node and connected electronic product and a switching means to connect said electronic product to said bus means; and said central control unit further includes a node communications multiplexer for directing communications from said host microprocessor along said bus means to said node microprocessors and means for addressing said nodes.

14. The switching network set forth in claim 13, wherein said bus means includes a bus for each group of electronic products being displayed.

15. The switching network set forth in claim 13, wherein each said node also includes an indicator lamp, illumination of said lamp indicating current selection of said electronic product connected to said node.

16. The switching network set forth in claim 14, wherein said electronic products include sources, amplifiers and speakers and said bus means includes a source bus, an amplifier bus and a speaker bus.

17. The switching network set forth in claim 16, wherein said bus means provides for all signal paths to and from an electronic product including product input and output signals, product power supply and all network control signals.

18. A method of interconnecting selected products of different electronic product groups on display utilizing a switching network including a plurality of nodes, one node operatively connected to each product on display, and a central control unit operatively connected to said nodes, comprising the steps of:

assigning an unique address number to each node and, therefore, each connected electronic product;

polling said nodes for work in order to solicit request for service messages from said nodes to said central control unit;

sending product control commands to said nodes from said central control unit in response to request for service messages;

interconnecting those electronic products selected by product control commands;

maintaining power to two and only two electronic products in a single product group so as to allow instantaneous comparison of the two powered products while also conserving power;

whereby a multi-product system is established for active demonstration of the selected electronic products.

19. The method set forth in claim 18, further including acknowledging a product control command after receipt thereof by sending a command acknowledgement message from said node to said central control unit.

20. The method set forth in claim 18, further including returning said switching network to its last operative configuration stored in the central control unit prior to polling said nodes for work.

21. The method set forth in claim 18, further including polling said nodes to solicit address request messages from said nodes to said central control unit prior to polling said nodes for work.

22. The method set forth in claim 18, further including confirming the presence of an electronic product connected to a node prior to sending product control commands.

* * * * *